(12) United States Patent
Tenghamn

(10) Patent No.: US 8,335,127 B2
(45) Date of Patent: Dec. 18, 2012

(54) METHOD FOR GENERATING SPREAD SPECTRUM DRIVER SIGNALS FOR A SEISMIC VIBRATOR ARRAY USING MULTIPLE BIPHASE MODULATION OPERATIONS IN EACH DRIVER SIGNAL CHIP

(75) Inventor: Stig Rune Lennart Tenghamn, Katy, TX (US)

(73) Assignee: PGS Geophysical AS, Lysaker (NO)

( * ) Notice: Subject to any disclaimer, the term of this patent is extended or adjusted under 35 U.S.C. 154(b) by 543 days.

(21) Appl. No.: 12/462,954

(22) Filed: Aug. 12, 2009

(65) Prior Publication Data

US 2011/0038225 A1 Feb. 17, 2011

(51) Int. Cl.
*G01V 1/38* (2006.01)

(52) U.S. Cl. .......................................................... 367/23

(58) Field of Classification Search ............... 367/15, 367/21, 23, 129, 130, 141, 143, 168, 189; 342/22
See application file for complete search history.

(56) References Cited

U.S. PATENT DOCUMENTS

| | | |
|---|---|---|
| 3,258,738 A | 6/1966 | Merchant |
| 3,886,493 A | 5/1975 | Farr |
| 4,049,077 A | 9/1977 | Mifsud |
| 4,159,463 A | 6/1979 | Silverman |
| 4,420,826 A | 12/1983 | Marshall, Jr. et al. |
| 4,633,970 A | 1/1987 | Mifsud |
| 4,706,230 A | 11/1987 | Inoue et al. |
| 4,715,020 A | 12/1987 | Landrum, Jr. |
| 4,780,856 A | 10/1988 | Becquey |
| 4,823,326 A | 4/1989 | Ward |
| 4,926,392 A | 5/1990 | Handley et al. |
| 4,941,202 A | 7/1990 | Upton |
| 4,969,129 A | 11/1990 | Currie |
| 5,126,979 A | 6/1992 | Rowe, Jr. et al. |
| 5,329,499 A | 7/1994 | Molund et al. |
| 5,375,101 A | 12/1994 | Wolfe et al. |
| 5,457,752 A | 10/1995 | Engdahl et al. |
| 5,546,361 A | 8/1996 | Boucher et al. |
| 5,583,512 A | 12/1996 | McEligot |
| 5,757,726 A | 5/1998 | Tenghamn et al. |
| 5,959,939 A | 9/1999 | Tengham et al. |
| 6,035,257 A | 3/2000 | Epperson |
| 6,041,888 A | 3/2000 | Tengham et al. |
| 6,076,629 A | 6/2000 | Tengham et al. |
| 6,085,862 A | 7/2000 | Tenghamn |

(Continued)

FOREIGN PATENT DOCUMENTS

EP 003029 12/2002

(Continued)

OTHER PUBLICATIONS

Data Sheet Terfenol-D.

(Continued)

*Primary Examiner* — Isam Alsomiri
*Assistant Examiner* — Krystine Breier

(57) ABSTRACT

A method for generating seismic energy for subsurface surveying include operating a first seismic vibrator above an area of the subsurface to be surveyed and operating at least a second seismic vibrator above the area substantially contemporaneously with the operating the first seismic vibrator. The first and the second vibrators each have a different selected frequency response. The first and second vibrators each is operated by a same direct sequence spread spectrum signal, wherein a different number of modulation operations for each logical value in the direct sequence spread spectrum signal is selected for each vibrator.

13 Claims, 14 Drawing Sheets

U.S. PATENT DOCUMENTS

| | | | |
|---|---|---|---|
| 6,488,117 | B1 | 12/2002 | Owen |
| 6,545,944 | B2 | 4/2003 | de Kok |
| 6,616,254 | B1 | 9/2003 | Raphaeli et al. |
| 6,704,245 | B2 * | 3/2004 | Becquey .................. 367/39 |
| 6,711,097 | B1 | 3/2004 | Engdahl |
| 6,714,867 | B2 | 3/2004 | Meunier |
| 6,766,256 | B2 | 7/2004 | Jeffryes |
| 6,851,511 | B2 * | 2/2005 | Tenghamn ............... 181/121 |
| 7,167,412 | B2 | 1/2007 | Tenghamn |
| 7,257,049 | B1 * | 8/2007 | Laws et al. .................. 367/23 |
| 7,327,633 | B2 | 2/2008 | Bagaini et al. |
| 7,376,045 | B2 | 5/2008 | Falkenberg et al. |
| 7,515,505 | B2 | 4/2009 | Krohn et al. |
| 7,551,518 | B1 | 6/2009 | Tenghamn |
| 7,620,193 | B2 | 11/2009 | Metheringham et al. |
| 7,881,158 | B2 | 2/2011 | Tenghamn |
| 7,881,160 | B2 | 2/2011 | Rouquette |
| 7,987,943 | B2 | 8/2011 | Wei et al. |
| 2002/0150050 | A1 * | 10/2002 | Nathanson ............... 370/241 |
| 2003/0221901 | A1 | 12/2003 | Tenghamn |
| 2007/0091719 | A1 | 4/2007 | Falkenberg et al. |
| 2009/0010103 | A1 * | 1/2009 | Sallas et al. ................. 367/41 |
| 2009/0245019 | A1 | 10/2009 | Falkenberg et al. |
| 2009/0321175 | A1 | 12/2009 | Tenghamn |
| 2010/0118646 | A1 | 5/2010 | Tenghamn |
| 2010/0118647 | A1 | 5/2010 | Tenghamn |
| 2010/0322028 | A1 | 12/2010 | Tenghamn |
| 2011/0038225 | A1 | 2/2011 | Tenghamn |

FOREIGN PATENT DOCUMENTS

| | | |
|---|---|---|
| EP | 2184618 A2 | 5/2010 |
| GB | 008398 | 4/2007 |
| RU | 1056100 | 7/1982 |
| RU | 2045079 | 9/1995 |
| RU | 2126983 | 2/1999 |
| SU | 1056100 A1 | 7/1982 |
| SU | 1056100 A | 11/1983 |
| WO | 0159481 A1 | 8/2001 |
| WO | WO 01/59481 | 8/2001 |
| WO | 2010002431 A1 | 1/2010 |
| WO | 20100037937 A1 | 4/2010 |

OTHER PUBLICATIONS

H. A. J. Rijnja, Low Frequency Projectors for Sound Under Water: Netherlands Organization for Applied Scientific Research, Jan. 1991, Report No. FEL-99-A268, The Hague, The Netherlands.

Feng Xia, Q. M. Zhang, Z. Y. Cheng, A Class IV Flextensional Device Based on Electrostrictive Poly(vinylidene flouride-trifluoroethylene) Copolymer, Jun. 2003.

Stig Rune Lennart Tenghamn, An Electrical marine Vibrator with Flextensional Shell, Exploration Geophysics, Dec. 2006, vol. 37, No. 4, Oxford, England.

Eurasian Search Report, mailing date: Nov. 29, 2010.

Robert Gold, (Oct. 1967), "Optimal binary sequences for spread spectrum multiplexing", IEEE Transactions on Information Theory, vol. IT-13, pp. 619-621.

Esmael H. Dinan, Bijan Jabbari, (Sep. 1998), "Spreading Codes for Direct Sequence CDMA and Wideband CDMA Cellular Networks", IEEE Communications Magazine, pp. 48-54.

Eurasian Search Report, date mailing: Nov. 29, 2010.

Frank de Jong, European Search Report for Application No. 10172496.1-1240 / 2284575. dated: Mar. 8, 2012.

Matthew J. Yedlin and Yair Linn, A Novel Method for Travel-Time Measurement for Geophysical Inversion Problems, Department of Electrical and Computer Engineering, University of British Columbia, 2332 Main Mall, Vancouver, BC, Canada.

* cited by examiner

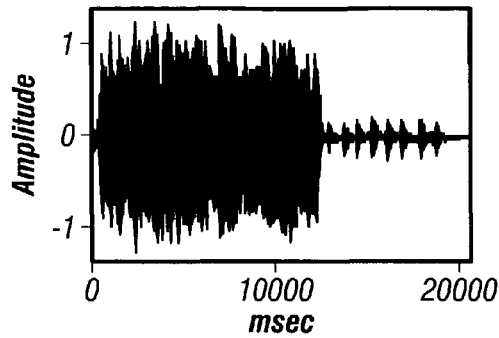 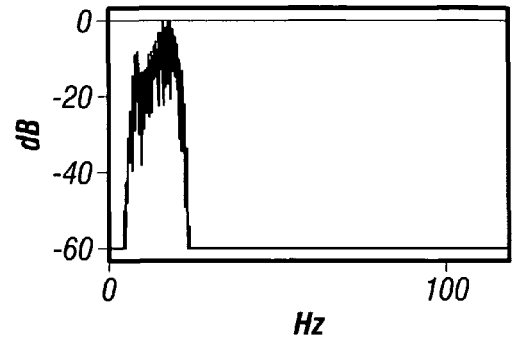
FIG. 12A　　　　　　　　　　FIG. 12B
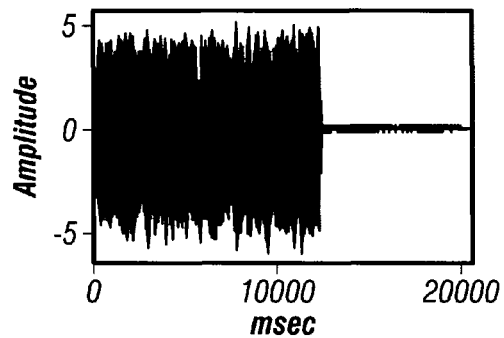 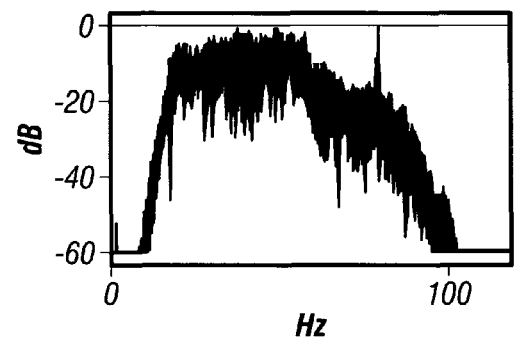
FIG. 13A　　　　　　　　　　FIG. 13B
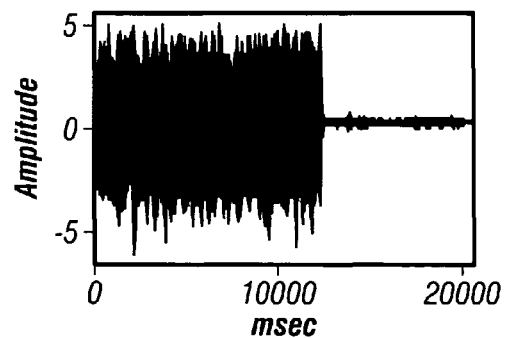 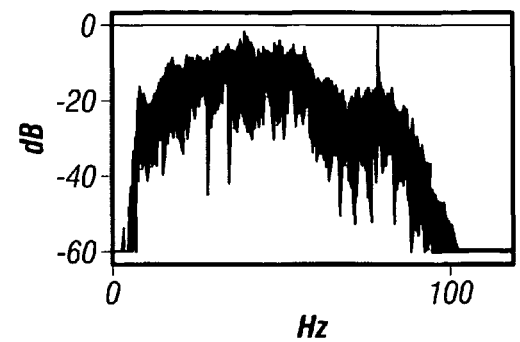
FIG. 14A　　　　　　　　　　FIG. 14B

METHOD FOR GENERATING SPREAD SPECTRUM DRIVER SIGNALS FOR A SEISMIC VIBRATOR ARRAY USING MULTIPLE BIPHASE MODULATION OPERATIONS IN EACH DRIVER SIGNAL CHIP

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to geophysical exploration and in particular to a vibratory seismic source useful in geophysical exploration. More particularly, the invention relates to methods for using vibrators for seismic data acquisition.

2. Background Art

Seismic energy sources, including vibrators, are used in geophysical exploration on land and in water covered areas of the Earth. Acoustic energy generated by such sources travels downwardly into the Earth, is reflected from reflecting interfaces in the subsurface and is detected by seismic receivers, typically hydrophones or geophones, on or near the Earth's surface or water surface.

Generally, a seismic vibrator includes a base plate coupled to the water or land surface, a reactive mass, and hydraulic or other devices to cause vibration of the reactive mass and base plate. The vibrations are typically conducted through a range of frequencies in a pattern known as a "sweep" or "chirp." Signals detected by the seismic receivers are cross correlated with a signal detected by a sensor disposed proximate the base plate. The result of the cross correlation is a seismic signal that approximates what would have been detected by the seismic receivers if an impulsive type seismic energy source had been used. An advantage provided by using vibrators for imparting seismic energy into the subsurface is that the energy is distributed over time, so that effects on the environment are reduced as compared to the environmental effects caused by the use of impulsive sources such as dynamite or air guns.

It is not only the possible environmental benefits of using vibrators that makes it desirable to use seismic vibrators in seismic surveying. By having a seismic energy source that can generate arbitrary types of seismic signals there may be substantial benefit to using more "intelligent" seismic energy signals than conventional sweeps or chirps. Such seismic energy sources would be able to generate signals have more of the characteristics of background noise, and thus be more immune to interference from noise, and at the same reduce their environmental impact.

A practical limit to using vibrators for such sophisticated signal schemes to operate marine vibrators in particular is the structure of marine vibrators known in the art. In order to generate arbitrary signals in the seismic frequency range it is necessary to have a source which has a high efficiency to make the source controllable within the whole seismic frequency range interest. Combining several vibrators that are individually controllable, with more sophisticated signal generating techniques would make it possible to generate seismic signals from several individual seismic energy sources at the same time that have a very low cross correlation, thereby making it possible to increase the efficiency of acquiring seismic data. Hydraulic marine vibrators known in the art typically have a resonance frequency that is higher than the upper limit of ordinary seismic frequencies of interest. This means that the vibrator energy efficiency will be relatively low, principally at low frequencies but generally throughout the seismic frequency range. Hydraulic marine vibrators can be difficult to control with respect to signal type and frequency content. Conventional marine seismic vibrators are also subject to strong harmonic distortion, which further limits the use of more complex driver signals. Such vibrator characteristics can be understood by examining the impedance for a low frequency vibrator.

The total impedance that will be experienced by a vibrator may be expressed as follows:

$$Z_r = R_r + jX_r \quad \text{(Eq. 1)}$$

wherein $Z_r$ is the total impedance, $R_r$ is the radiation impedance, and $X_r$ is the reactive impedance.

In an analysis of the energy transfer of a marine vibrator, the system including the vibrator and the water may be approximated as a baffled piston. The radiation impedance $R_r$ of a baffled piston can be expressed as:

$$R_r = \pi a^2 \rho_0 c R_1(x) \quad \text{(Eq. 2)}$$

and the reactive impedance can be expressed as:

$$X_r = \pi a^2 \rho_0 c X_1(x) \quad \text{(Eq. 3)}$$

where:

$$x = 2ka = \frac{4\pi a}{\lambda} = \frac{2\omega a}{c} \quad \text{(Eq. 4)}$$

$$R_1(x) = 1 - \frac{2}{x} J_1(x) \quad \text{(Eq. 5)}$$

$$X_1(x) = \frac{4}{\pi} \int_0^{\frac{\pi}{2}} \sin(x\cos\alpha)\sin^2\alpha \, d\alpha \quad \text{(Eq. 6)}$$

in which $\rho_0$ is the density of water, $\omega$ is the angular frequency, k is the wave number, a is the radius of the piston, c is the acoustic velocity, $\lambda$ is the wave length, and $J_1$ is a Bessel function of the first order.

Applying the Taylor series expansion to the above equations provides the expressions:

$$R_1(x) = \frac{x^2}{2^2 1! 2!} - \frac{x^4}{2^4 2! 3!} + \cdots \quad \text{(Eq. 7)}$$

$$X_1(x) = \frac{4}{\pi}\left[\frac{x}{3} - \frac{x^3}{3^2 \cdot 5} + \frac{x^5}{3^2 \cdot 5^2 \cdot 7} - \cdots\right] \quad \text{(Eq. 8)}$$

For low frequencies, when x=2ka is much smaller than 1, the real and imaginary part of the total impedance expression may be approximated with the first term of the Taylor series expansion. The expressions for low frequencies, when the wave length is much larger than the radius of the piston, become:

$$R_1(x) \to \frac{1}{2}(ka)^2 \quad \text{(Eq. 9)}$$

$$X_1(x) \to \frac{8ka}{3\pi} \quad \text{(Eq. 10)}$$

It follows that for low frequencies the radiation impedance R will be small as compared to the reactive impedance X, which suggests low efficiency signal generation. Accordingly, there is a need for efficient marine vibrators that can generate complex signals and there is a need to improve the time efficiency of operating seismic data acquisition to provide more economical operation and to minimize the environmental impact of marine seismic surveying.

There is also a need for seismic vibrator driver signals that can improve the efficiency with which equivalent signals to those generated by an impulsive seismic source may be recovered from a plurality of seismic vibrators operated substantially contemporaneously.

SUMMARY OF THE INVENTION

A method for generating seismic energy for subsurface surveying include operating a first seismic vibrator above an area of the subsurface to be surveyed and operating at least a second seismic vibrator above the area substantially contemporaneously with the operating the first seismic vibrator. The first and the second vibrators each have a different selected frequency response. The first and second vibrators each is operated by a same direct sequence spread spectrum signal, wherein a different number of modulation operations for each logical value in the direct sequence spread spectrum signal is selected for each vibrator.

A method for subsurface seismic surveying according to another aspect of the invention include operating a plurality of seismic vibrators each having a different selected frequency response above an area of the subsurface to be surveyed. Seismic signals originating from the plurality of vibrators are detected at each of a plurality of seismic receivers disposed at spaced apart locations above the area. Each vibrator is operated by a same direct sequence spread spectrum driver signal. A different number of modulation operations is selected for each logical value in the driver signal used for each vibrator. Seismic energy originating from each of the plurality of vibrators is determined from the detected seismic signals.

Other aspects and advantages of the invention will be apparent from the description and the claims that follow.

BRIEF DESCRIPTION OF THE DRAWINGS

FIGS. 12A and 12B show, respectively, a DSSS signal and response of a low frequency vibrator to the DSSS driver signal.

FIGS. 13A and 13B show, respectively, a DSSS signal and response of a higher frequency vibrator than that shown in FIG. 12B to the DSSS driver signal.

FIGS. 14A and 14B show, respectively, combined DSSS signals and output of the two vibrators as shown in FIGS. 12A, 12B, 13A and 13B.

DETAILED DESCRIPTION

The invention is related to methods for using a plurality of seismic vibrators. The seismic vibrators used with methods according to the invention each preferably have at least two resonant frequencies within a selected seismic frequency range, and each of the vibrators in the array preferably has a different frequency range than the other vibrators.

The description which follows includes first a description of a particular type of seismic vibrators that may be used advantageously with methods according to the invention in marine seismic surveying. Such description will be followed by explanation of the particular types of driver signals that may be used to increase the frequency range and to enable using a same base driver signal to detect the equivalent of impulsive seismic energy from signals detected by seismic sensors. The present invention is described with reference to marine seismic vibrators, however, it should be understood that the principles of the present invention are equally applicable to seismic vibrators operated on the land surface, and as a result, the invention is not limited in scope to use with marine vibrators.

Figure 1:
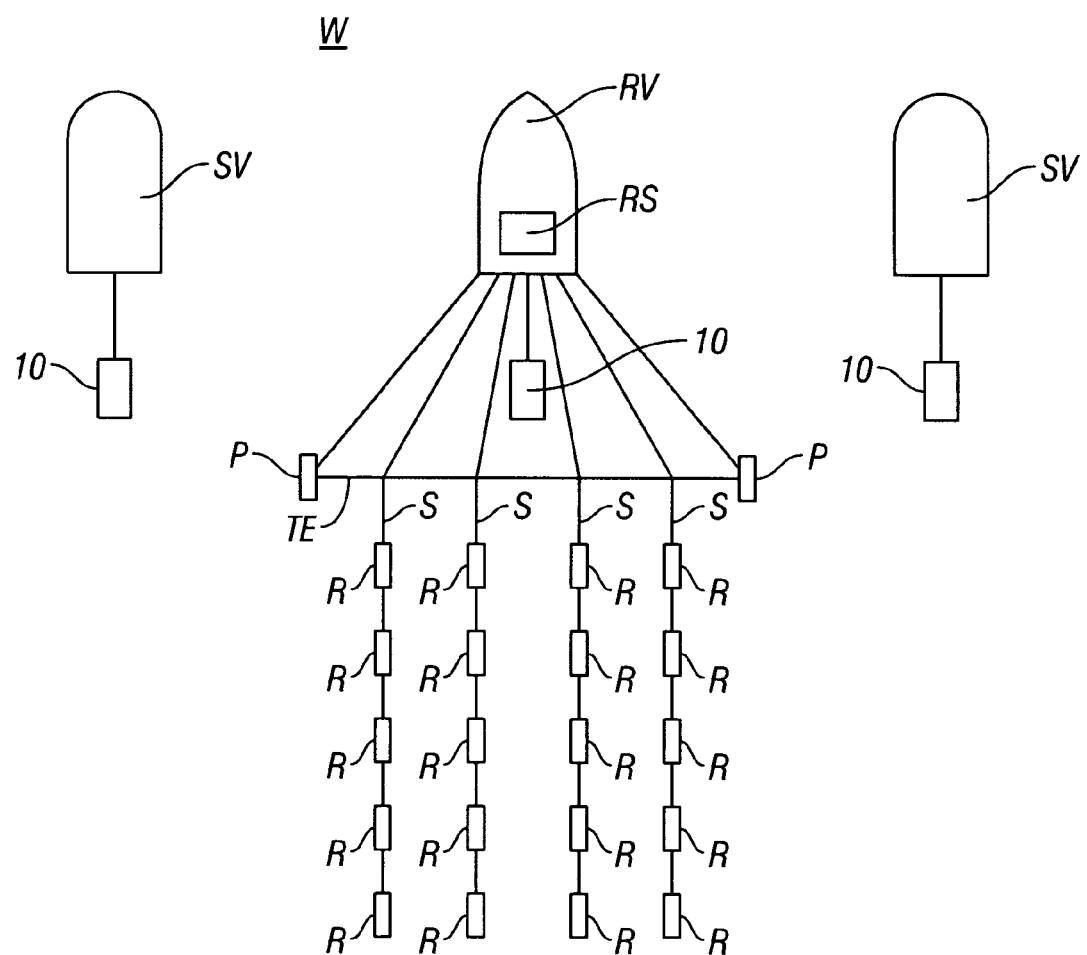
FIG. 1 shows an example marine seismic survey being conducted using a plurality of seismic energy sources.

An example of marine seismic surveying using a plurality of marine vibrator seismic energy sources is shown schematically in FIG. 1. A seismic survey recording vessel RV is shown moving along the surface of a body of water W such as a lake or the ocean. The seismic survey recording vessel RV typically includes equipment, shown at RS and referred to for convenience as a "recording system" that at selected times actuates one or more seismic vibrators 10, determines geodetic position of the various components of the seismic acquisition system, and records signals detected by each of a plurality of seismic receivers R.

The seismic receivers R are typically deployed at spaced apart locations along one or more streamer cables S towed in a selected pattern in the water W by the recording vessel RV (and/or by another vessel). The pattern is maintained by certain towing equipment TE including devices called "paravanes" that provide lateral force to spread the components of the towing equipment TE to selected lateral positions with respect to the recording vessel RV. The configuration of towing equipment TE, paravanes P and streamer cables S is provided to illustrate the principle of acquiring seismic signals according to some aspects of the invention and is not in any way intended to limit the types of recording devices that may be used, their manner of deployment in the water or the number of and type of such components.

The recording vessel RV may tow the seismic vibrator 10. In the example of FIG. 1, additional seismic vibrators 10 may be towed at selected relative positions with respect to the recording vessel RV by source vessels SV. The purpose of providing the additional vibrators 10 towed by source vessels SV is to increase the coverage of the subsurface provided by the signals detected by the seismic receivers R. The numbers of such additional vibrators 10 and their relative positions as shown in FIG. 1 are not intended to limit the scope of the invention. Further, any or all of the vibrators 10 may be a plurality of proximately located seismic vibrators each having a different frequency response range.

Figure 16:
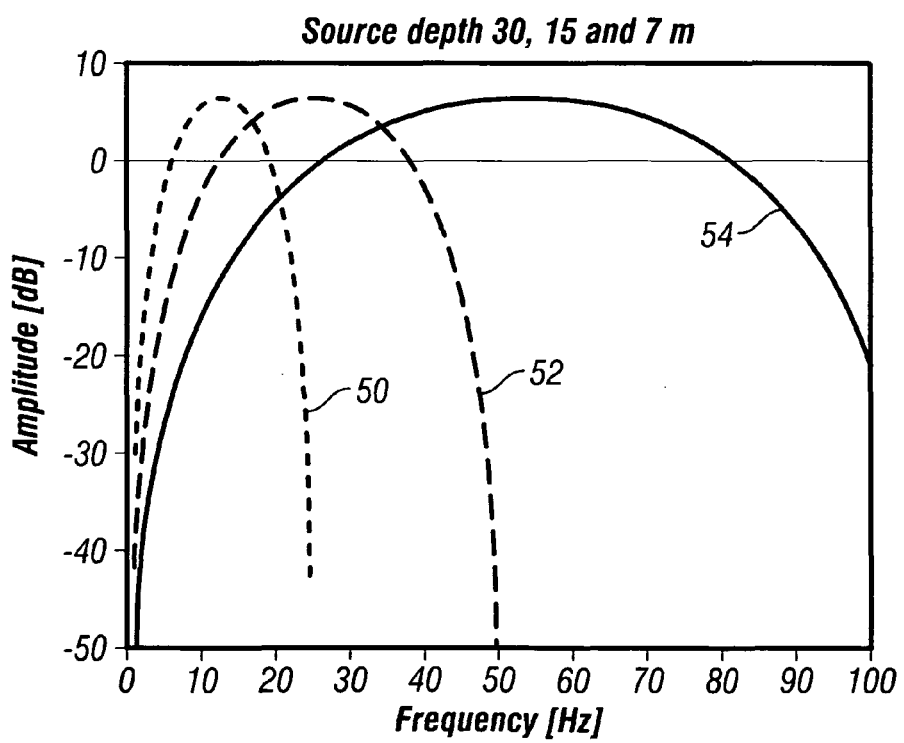
FIG. 16 shows an example frequency spectrum of three vibrator sources each operated at a different depth in the water.

In some examples, as will be further explained with reference to FIG. 16, a plurality of vibrators each having a different frequency response range may be operated with each such vibrator at a depth corresponding to the frequency range of the vibrator.

Figure 2:
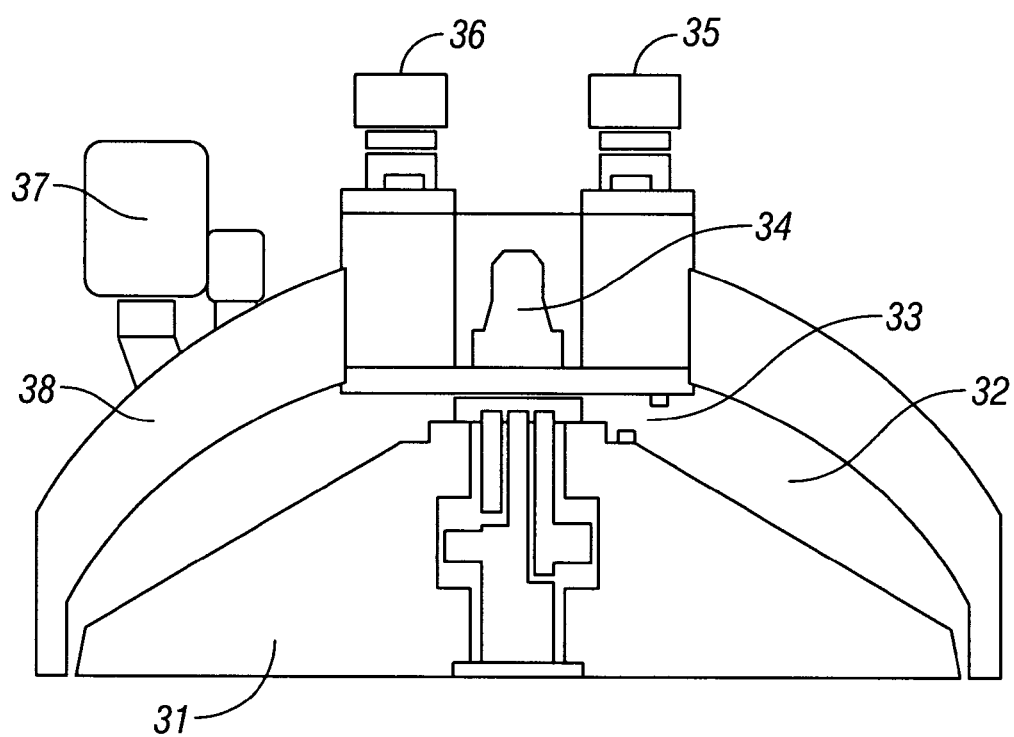
FIG. 2 shows an example structure for a conventional hydraulic seismic vibrator.

FIG. 2 shows an example of a conventional hydraulic marine vibrator. Hydraulic oil feed is shown at 35 and the oil return is shown at 36. A piston (base plate) 31 generates an acoustic pressure wave and is disposed inside a bell housing (reactive mass) 38. Air 32 is disposed between the piston 31 and the bell housing 38. Motion of the piston 31 is regulated with a servo valve 34. An accelerometer 33 is used to provide a feedback or pilot signal. Isolation mounts 37 are mounted on the bell housing 38 to reduce vibrations in the handling system (not shown) used to deploy the vibrator. Due to the rigid design of the vibrator, the first resonance frequency of such a vibrator is typically above the upper limit of the seismic frequency band, and such vibrator will have low efficiency at typical seismic frequencies.

Figure 3:
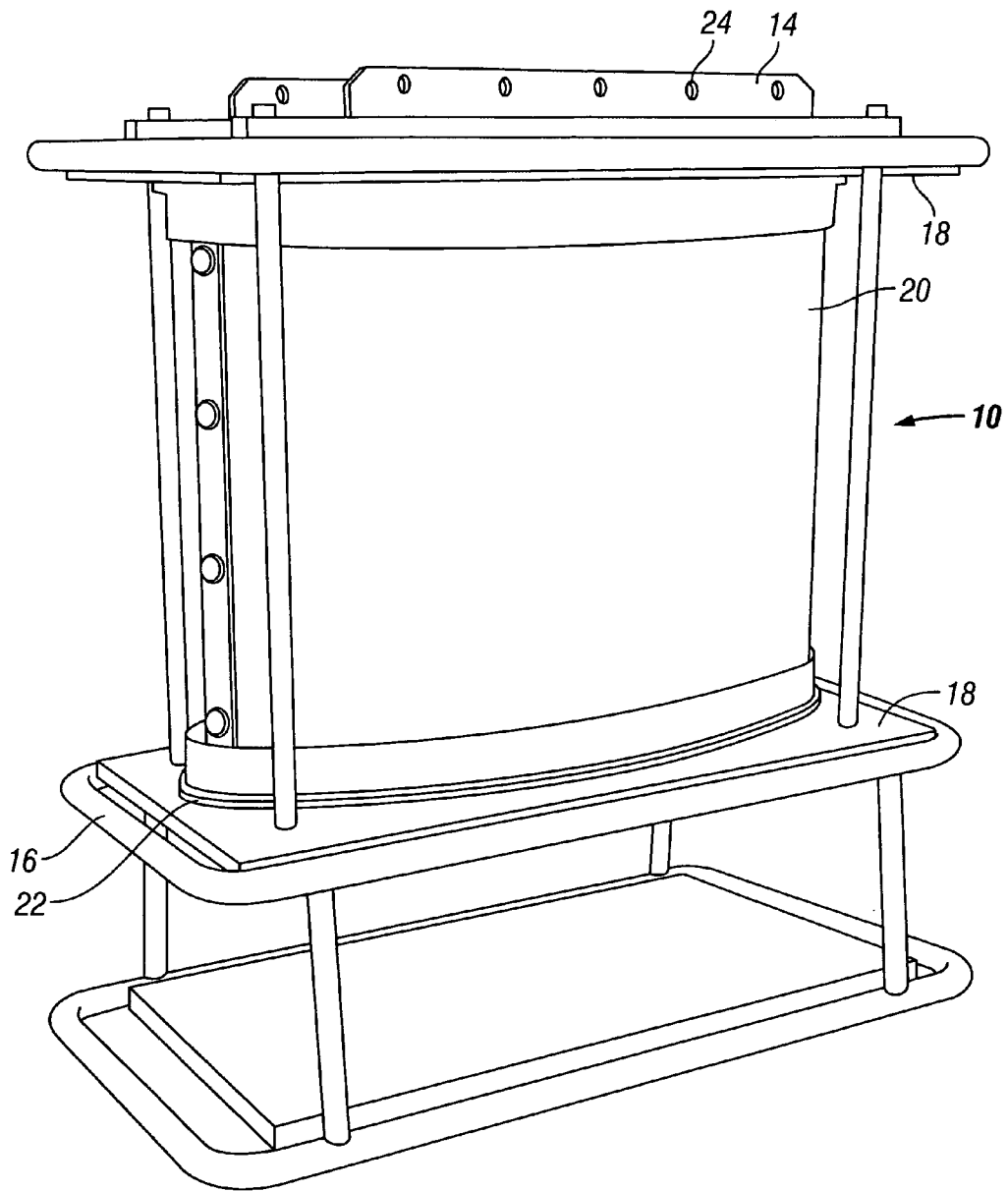
FIG. 3 shows an example structure for an electrical seismic vibrator.

FIG. 3 shows an example of a different type of marine vibrator that can be used in accordance with the invention. The marine vibrator 10 comprises a vibrator source 20 mounted within a frame 16. A bracket 14 is connected to the top of the frame 16 and includes apertures 24 which may be used for deploying the vibrator 10 into the water.

Figure 4:
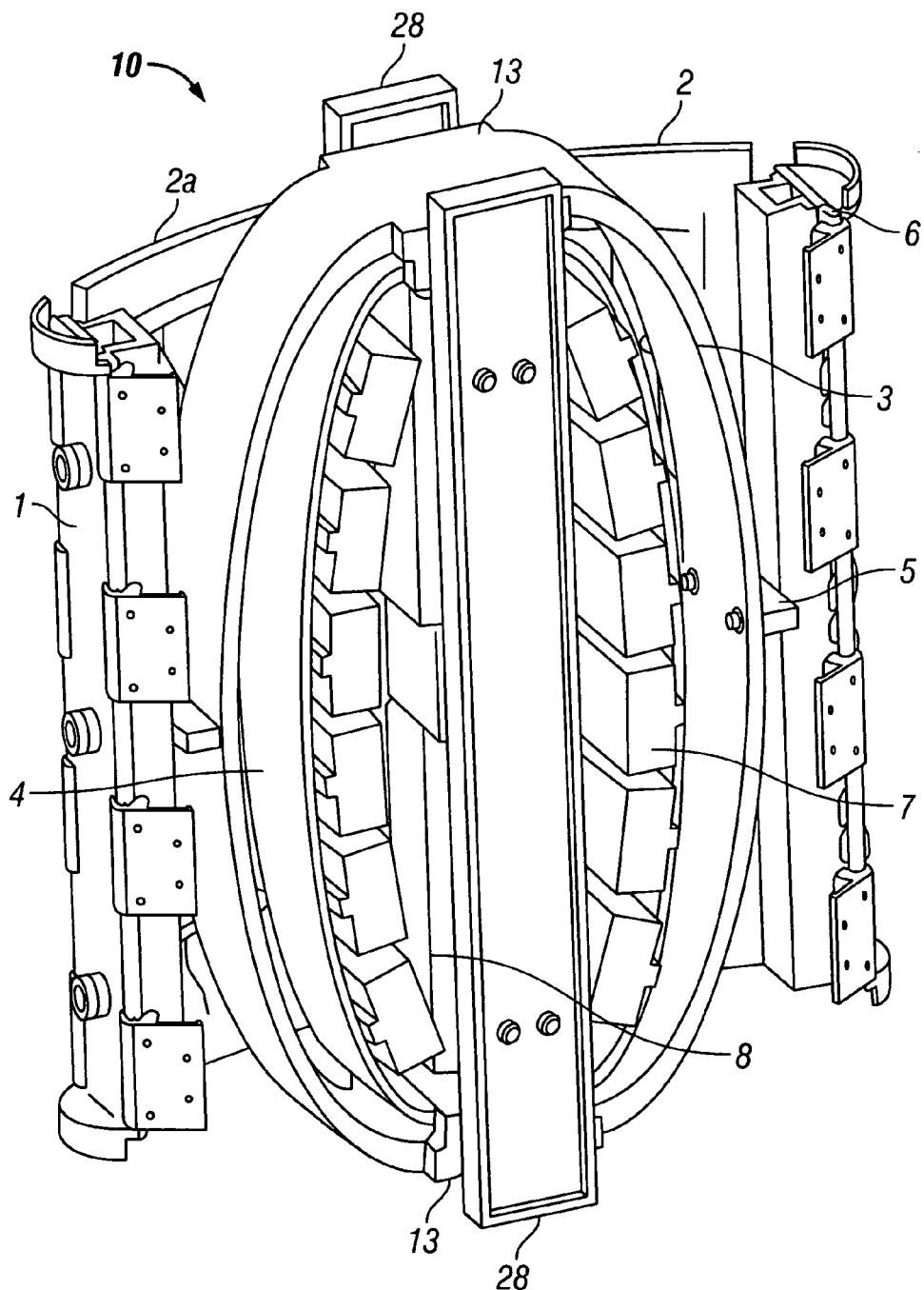
FIG. 4 shows another example vibrator in cross-section.

FIG. 4 shows an example of the vibrator in partial cross-section, which includes a driver 8, which may be a magnetostrictive driver, and which may in some examples be formed from an alloy made from terbium, dysprosium and iron. Such alloy may have the formula Tb(0.3) Dy(0.7) Fe(1.9), such formulation being known commercially as Terfenol-D. Although the particular example vibrator described herein shows only a single driver, an implementation in which a plurality of drivers are used is within the scope of the invention. The present example further includes an outer driver spring 3 connected to each end 13 of the driver 8. In a particular implementation, the driver spring 3 may have an elliptical shape. In the present example in which the driver 8 comprises Terfenol-D, the driver 8 further comprises magnetic circuitry (not specifically shown) that will generate a magnetic field when electrical current is applied thereto. The magnetic field will cause the Terfenol-D material to elongate. By varying the magnitude of the electrical current, and consequently the magnitude of the magnetic field, the length of the driver 8 is varied. Typically, permanent magnets are utilized to apply a bias magnetic field to the Terfenol-D material, and variation in the magnetic field is generated by applying a varying electrical current to the electrical coils (not shown) that are formed around the Terfenol-D material. Variations in the length of the driver 8 cause a corresponding change in the dimensions of the outer driver spring 3.

FIG. 4 shows additional vibrator components including an inner spring 4, with masses 7 attached thereto. As further discussed below, the inner driver spring 4 with masses 7 attached thereto can be included to provide a second system resonance frequency within the seismic frequency range of interest. Although a vibrator system that included only the outer spring 3 would typically display a second resonance frequency, for systems having a size suitable for use in marine geophysical exploration, the second resonance frequency in such case would be much higher than the frequencies within the seismic frequency range of interest (typically from 0 to 300 Hz).

Mounting brackets 28, shown in FIG. 4, are fixedly connected at the upper and lower ends thereof to upper and lower end plates 18 (shown in FIG. 3). The driver 8 is fixedly connected at a longitudinally central location thereof to the mounting brackets 28, to maintain a stable reference point for driver 8. The movement of the ends 13 of the driver rod is unrestricted with respect to the mounting brackets 28.

The example shown in FIG. 4 further includes an outer shell 2, to which the outer spring 3 is connected through transmission elements 5. The form of the shell 2 is generally referred to as flextensional. In a particular implementation, the outer shell 2 comprises two side portions that may be substantially mirror images of each other, and includes two end beams 1, with the side portions of the shell 2 being hingedly connected to the end beams 1 by hinges 6. FIG. 4 shows one of the side portions of the outer shell 2, denoted as shell side portion 2a. When fully assembled the second shell side portion (not shown in FIG. 3), comprising substantially a mirror image of shell side portion 2a will be hingedly connected by hinges 6 to end beams 1, to complete a flextensional shell surrounding the assembled driver 8, outer spring 3 and inner spring 4.

Figure 5:
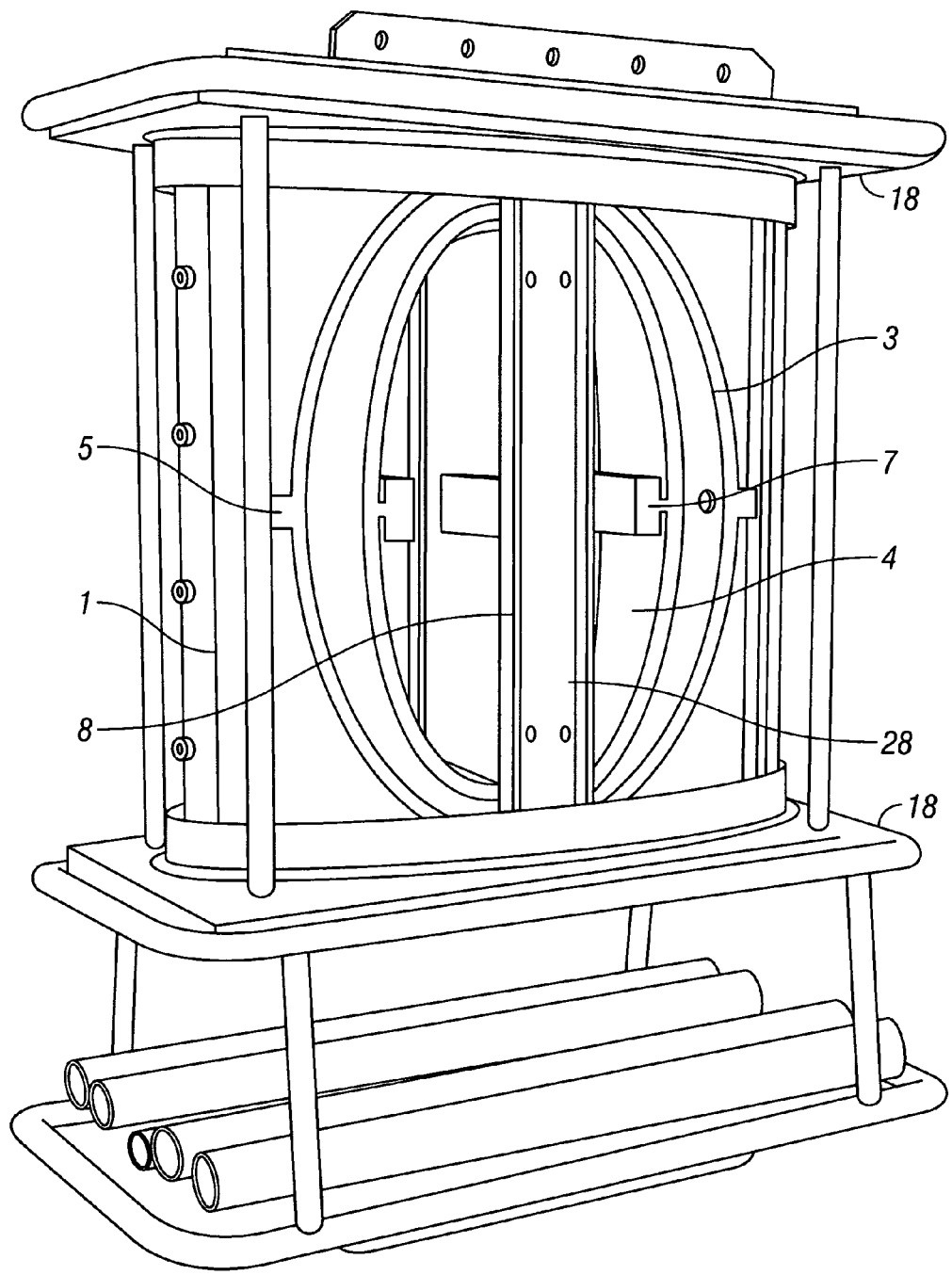
FIG. 5 shows another example vibrator in cross-section.

FIG. 5 shows a cross section of the assembly in FIG. 4 mounted in the marine vibrator 10.

With reference to FIG. 3 the marine vibrator 10 further comprises top and bottom end plates 18. The assembled outer shell 2, comprising the two shell side portions and the two end beams 1 are sealingly attached to the top and bottom end plates 18. Although the outer shell 2 is sealingly engaged with the top and bottom end plates 18, when the marine vibrator 10 is in operation, the outer shell 2 will enable movement with respect to the end plates 18, so the connection between the end plates 18 and the outer shell 2 will be a flexible connection, that might be provided, for example, by a flexible membrane 22 (not shown in detail).

Figure 6:
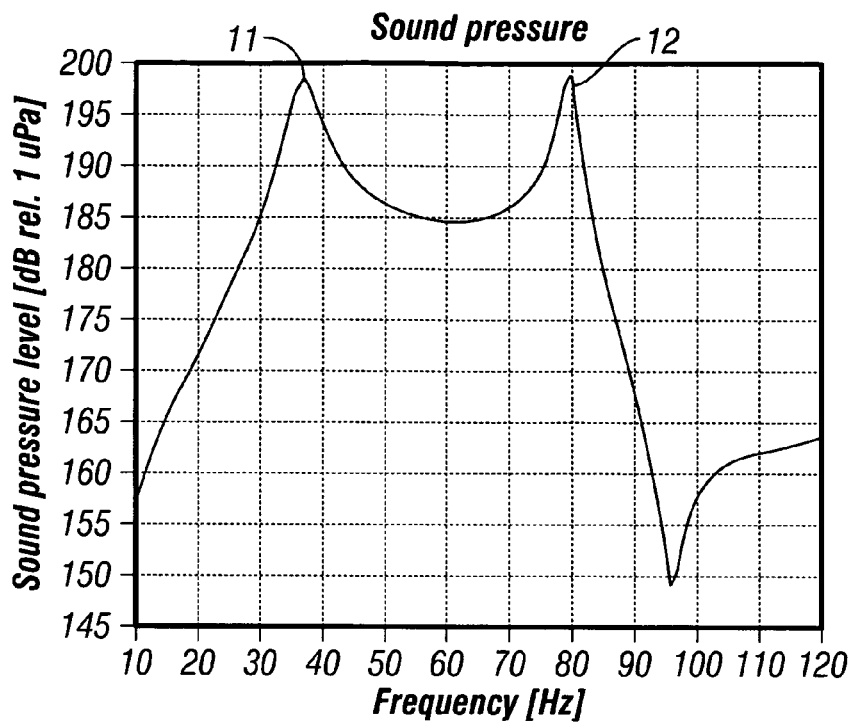
FIG. 6 shows a simulated amplitude spectrum with two resonances.
Figure 7:
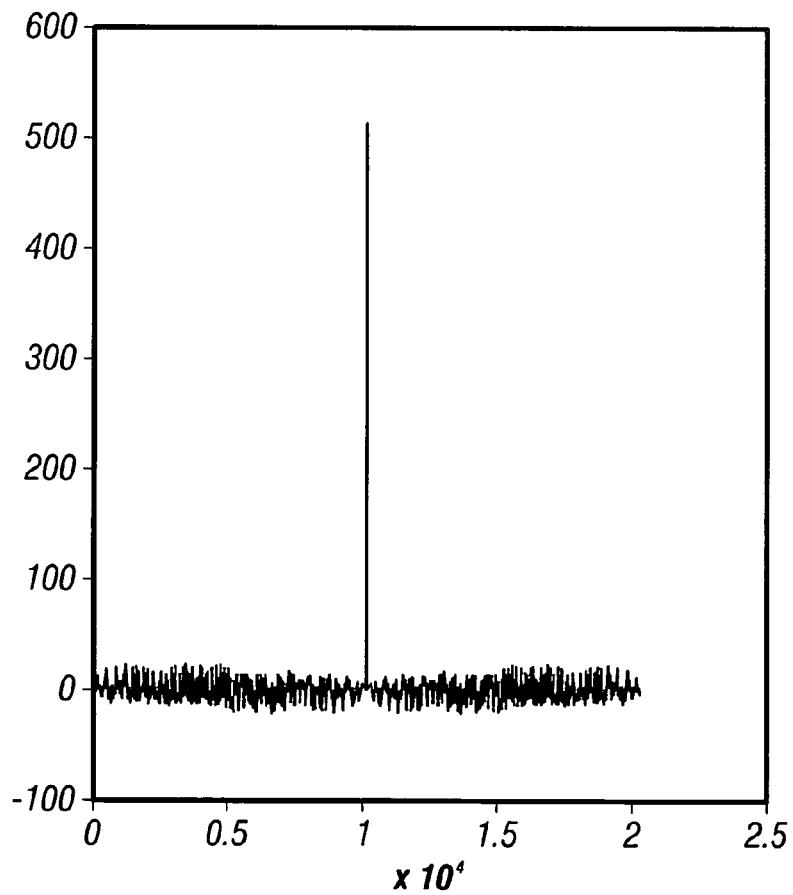
FIG. 7 is an example autocorrelation function for one type of direct sequence spread spectrum signal.

FIG. 6 shows the results from a finite element simulation of an example of the vibrator. A first resonance frequency 11 results substantially from interaction of the outer spring 3 and the driver. A second resonance frequency 12 results substantially from the interaction of the inner driver spring 4 with its added masses 7 and the driver 8.

The outer driver spring 3 and the inner driver spring 4 shown in the figures could be different types of springs than those shown. For example, the springs might be coiled springs or other type of springs that perform substantially similarly. Essentially, the springs 3 and 4 are biasing devices that provide a force related to an amount of displacement of the biasing device. Similarly, the outer spring 3 and inner driver spring 4 might use a diaphragm, a piston in a sealed cylinder or a hydraulic cylinder to achieve the substantially the same result.

By introducing a resonance in the lower end of the seismic frequency spectrum, low frequency acoustic energy may be generated more efficiently. At resonance the imaginary (reactive) part of the impedance is substantially cancelled, and the acoustic source is able to efficiently transmit acoustic energy into the water. In constructing any specific implementation of the marine vibrator, finite element analysis may be used, as is known to those skilled in the art, to determine the first and second resonance frequencies. In any such analysis, the following principles of operation are relevant. If the outer shell is approximated as a piston, then, for low frequencies, the mass load, or the equivalent fluid mass acting on the shell can be expressed as $$M = \rho_0 \frac{8a^3}{3} \quad \text{(Eq. 11)}$$

where, M is the mass load, $\rho_0$ is density of water, and a is the equivalent radius for a piston which corresponds to the size of outer shell.

The outer shell 2 has a transformation factor $T_{shell}$ between the long and short axis of its ellipse, so that the deflection of the two shell side portions (side portion 2a in FIG. 4 and its mirror image on the other side of outer shell 2) will have a higher amplitude than the deflection of end beams 1 (which interconnects the two side portions of shell 2) caused by movement of transmission element 5. Further, the outer spring 3 creates a larger mass load on the driver 8 since the outer spring 3 also has a transformation factor between the long axis and short axis of its ellipse, with the long axis being substantially the length of the driver 8 and the short axis being the width of the elliptically shaped spring. Referring to this transformation factor as $T_{spring}$, the mass load on the driver 8 will be expressed as:

$$M_{driver} = (T_{shell})^2 \cdot (T_{spring})^2 \cdot \rho_0 \frac{8a^3}{3}. \quad \text{(Eq. 12)}$$

The first resonance, $f_{resonance}$, for the vibrator will be substantially determined by the following mass spring relationship $$f_{resonance} = \frac{1}{2\pi}\sqrt{\frac{K}{M_{driver}}} \quad \text{(Eq. 13)}$$

where K=spring constant, and $M_{outer}$=mass load on the driver 8.

K represents the spring constant for the outer spring 3 combined with the drive 8, where the outer spring 3 is connected to the outer shell 2, through the transmission elements 5, end beam 1 and hinges 6.

To provide efficient energy transmission with the seismic frequency range of interest, it is important to have the vibrator configured to have a second resonance frequency within the seismic frequency range of interest. In the absence of the inner spring, the second resonance frequency would occur when the outer driver spring 3, acting together with driver 8, has its second Eigen-mode. This resonance frequency, however, is normally much higher than the first resonance frequency, and accordingly, would be outside the seismic frequency range of interest. As is evident from the foregoing equation, the resonant frequency will be reduced if the mass load on outer spring 3 is increased. This mass load could be increased by adding mass to driver 8, however, in order to add sufficient mass to achieve a second resonance frequency within the seismic frequency range of interest, the amount of mass that would need to be added to the driver would make such a system impractical for use in marine seismic operations. In a practical example vibrator, a second spring, the inner driver spring 4, is included inside the outer driver spring 3 with added masses 7 on the side of the inner spring 3. The effect of such added mass is equivalent to adding mass in the end of the driver 8.

$$M_{inner} = (T_{inner})^2 \cdot M_{added}. \quad \text{(Eq. 14)}$$

The extra spring, i.e., the inner driver spring 4, will have a transformation factor $T_{inner}$ as well, and will add to the mass load on the driver 8. Use of the inner spring 4, with the added mass, allows the second resonance of the system to be tuned so that the second resonance is with in the seismic frequency range of interest, thereby improving the efficiency of the vibrator in the seismic frequency band. The second resonance may be determined by the expression:

$$f_{resonance2} = \frac{1}{2\pi}\sqrt{\frac{K_{inner} + K_{driver}}{(T_{inner})^2 \cdot M_{added}}}. \quad \text{(Eq. 15)}$$

in which $K_{inner}$=spring constant of inner spring and $K_{driver}$=spring constant of outer driver assembly.

A possible advantage of using a driver structure as explained herein is that the multiple resonant frequencies may provide a broader bandwidth response than is possible using single resonance vibrator structures. A particular advantage of using a vibrator having an electrically operated energizing element (driver) is that the vibrator response to an input control signal will be more linear. Such may make possible the use of particular types of driver signals to be explained below.

In using the system shown in FIG. 1, it may be advantageous to use more than one of the seismic vibrators 10 substantially contemporaneously or even simultaneously in order to increase the efficiency with which seismic signals related to subsurface formations (below the water bottom) may be obtained. Seismic signals detected by each of the receivers R in such circumstances will result in seismic energy being detected that results from each of the vibrators 10 actually in operation at the time of signal recording.

In other examples, operating the vibrators contemporaneously can include driving each vibrator with a "direct sequence spread spectrum" signal. Direct sequence spread spectrum signal ("DSSS") generation uses a modulated, coded signal with a "chip" frequency selected to determine the frequency content (bandwidth) of the transmitted signal. A "chip" means a pulse shaped bit of the direct sequence coded signal. Direct sequence spread spectrum signals also can be configured by appropriate selection of the chip frequency and the waveform of a baseband signal so that the resulting DSSS signal has spectral characteristics similar to background noise.

In the present invention, the same DSSS signal can be used to drive each of a plurality of vibrators in a plurality of vibrators. The driver signal used to directly operate each vibrator in the array can be modulated using a unique number of biphase modulation operations for each chip in the coded sequence. The number of biphase modulation operations for each chip may be selected to provide the equivalent of a unique chip frequency rate, and thus frequency content of the driver signal, for the driver signal use to operate each vibrator in the plurality of vibrators. The foregoing will be further explained below with reference to FIGS. 17 through 20.

Figure 1A:
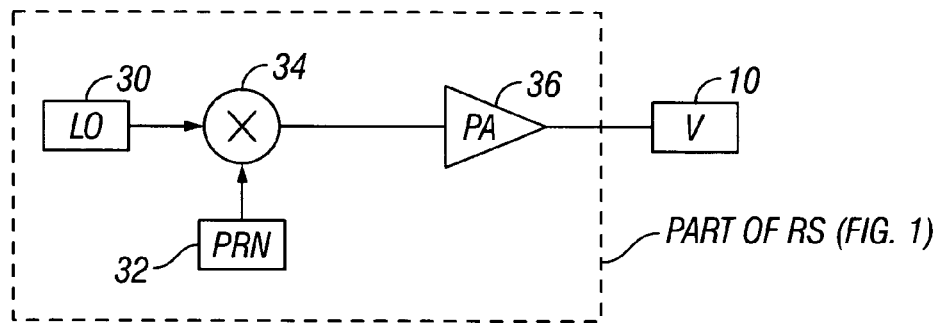
FIG. 1A shows an example implementation of a seismic vibrator signal generator.

An example implementation of a signal generator to create particular types of vibrator signals used in the invention is shown schematically in FIG. 1A. A local oscillator 30 generates a baseband carrier signal. In one example, the baseband carrier signal may be a selected duration pulse of direct current, or continuous direct current. In other examples, the baseband signal may be a sweep or chirp as used in conventional vibrator-source seismic surveying, for example traversing a range of 10 to 150 Hz. A pseudo random number ("PRN") generator or code generator 32 generates a sequence of numbers +1 and −1 according to certain types of encoding schemes as will be explained below. The PRN generator 32 output and the local oscillator 30 output are mixed in a modulator 34. Output of the modulator 34 is conducted to a power amplifier 36, the output of which ultimately operates one of the seismic vibrators 10. A similar configuration may be used to operate each of a plurality of vibrators such as shown in FIG. 1.

Figure 18:
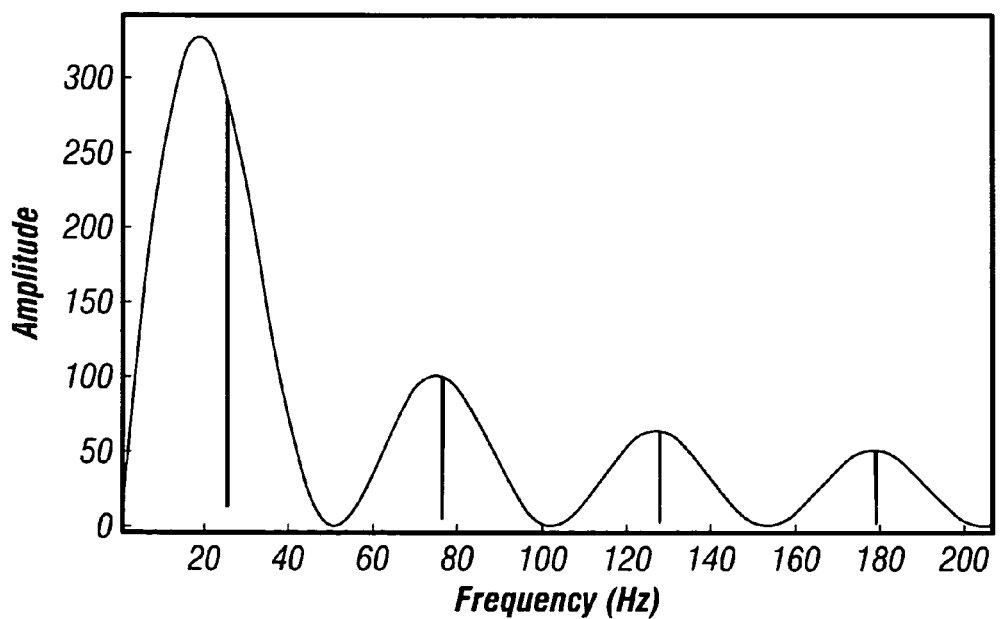
FIG. 18 shows frequency content of a vibrator operated using the 255 chip DSSS driver signal described with reference to FIG. 17.

Signals generated by the device shown in FIG. 1A can be detected using a device such as shown in FIG. 18. Each of the seismic receivers R may be coupled to a preamplifier 38, either directly or through a suitable multiplexer (not shown). Output of the preamplifier 38 may be digitized in an analog to digital converter ("ADC") 40. A modulator 42 mixes the signal output from the ADC 40 with the identical code produced by the PRN generator 32. As will be explained below, the signal generating device shown in FIG. 1A, and its corresponding signal detection device shown in FIG. 1B generate and detect a DSSS.

The theoretical explanation of DSSS signal generation and detection may be understood as follows. The DSSS signal, represented by $u_i$, can be generated by using a spectrum "spreading code", represented by $c_i$ and generated, for example, by the PRN generator (32 in FIG. 1A), to modulate a baseband carrier. A baseband carrier can be generated, for example, by the local oscillator (30 in FIG. 1A). The baseband carrier has a waveform represented by $\psi(t)$. The spreading code has individual elements $c_{ij}$ (called "chips") each of which has the value +1 or −1 when $0 \leq j < N$ and 0 for all other values of j. If a suitably programmed PRN generator is used, the code will repeat itself after a selected number of chips. N is the length (the number of chips) of the code before repetition takes place. The baseband carrier is preferably centered in time at t=0 and its amplitude is normalized so that at time zero the baseband carrier amplitude is equal to unity, or ($\psi(0)=1$). The time of occurrence of each chip i within the spreading code may be represented by Tc. The signal used to drive each vibrator may thus be defined by the expression:

$$u_i(t) = \sum_{j=-\infty}^{\infty} c_i^j \psi(t - jT_c) \quad \text{(Eq. 16)}$$

The waveform $u_i(t)$ is deterministic, so that its autocorrelation function is defined by the expression:

$$R_u(\tau) = \int_{-\infty}^{\infty} u(t)u(t - \tau)dt \quad \text{(Eq. 17)}$$

where $\tau$ is the time delay between correlated signals. The discrete periodic autocorrelation function for $a=a_j$ is defined by $$R_{a,a}(l) = \begin{cases} \sum_{j=0}^{N-1-l} a_j a_{j+l}, & 0 \leq l \leq N-1 \\ \sum_{j=0}^{N-1+l} a_{j-l} a_j, & 1-N \leq l < 0 \\ 0, & |l| \geq N \end{cases} \quad \text{(Eq. 18)}$$

Using a formula similar to Eq. 17 it is possible to determine the cross correlation between two different signals by the expression:

$$R_{u,u'}(\tau) = \int_{-\infty}^{\infty} u(t)u'(t - \tau)dt \quad \text{(Eq. 19)}$$

The discrete periodic cross-correlation function for $a=a_j$ and $b=b_j$, is defined by the expression:

$$R_{a,b}(l) = \begin{cases} \sum_{j=0}^{N-1-l} a_j b_{j+1}, & 0 \leq l \leq N-1 \\ \sum_{j=0}^{N-1+l} a_{j-l} b_j, & 1-N \leq l < 0 \\ 0, & |l| \geq N \end{cases} \quad \text{(Eq. 20)}$$

The signal detected by the receivers (R in FIG. 1) will include seismic energy originating from the one of the vibrators for which seismic information is to be obtained, as well as several types of interference, such as background noise, represented by n(t), and from energy originating from the other vibrators transmitting at the same time, but with different direct sequence spread spectrum codes (represented by $c_k(t)$ wherein k≠i). The received signal at each receiver, represented by $x_i(t)$, that is, the signal detected by each of the receivers (R in FIG. 1) in a system with M seismic vibrators operating at the same time, can be described by the expression:

$$x_i(t) = \sum_{j=1}^{M} u_j(t) + n(t) \quad \text{(Eq. 21)}$$

Figure 1B:
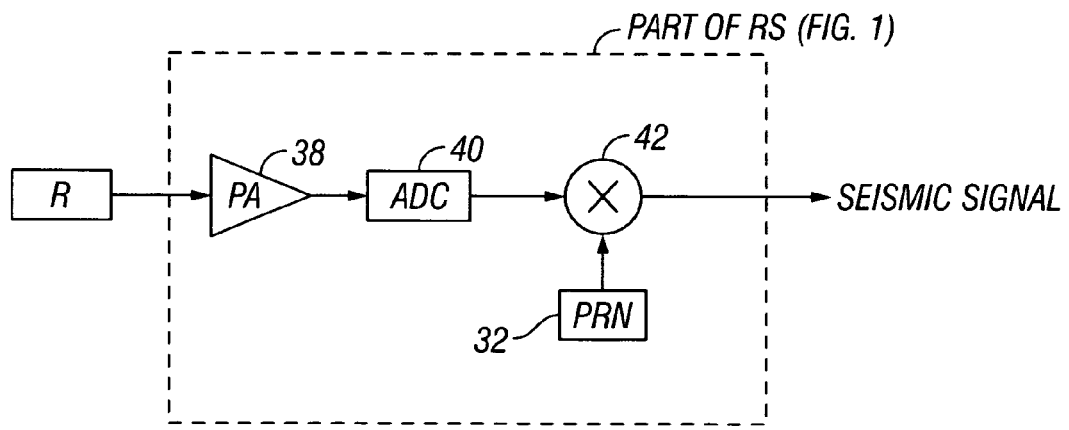
FIG. 1B shows an example signal detection device coupled to a seismic receiver.

The energy from each vibrator will penetrate the subsurface geological formations below the water bottom (or below the land surface), and reflected signals from the subsurface will be detected at the receivers after a "two way" travel time depending on the positions of the vibrators and receivers and the seismic velocity distribution in the water and in the subsurface below the water bottom (or land surface). If the transmitted vibrator signal for direct sequence spread spectrum code i occurs at time $t=t_0$, then the received signal resulting therefrom occurs at time $t=\tau_k + l_k T_c + t_0$ after the transmission, wherein $l_k$=any number being an integer and $\tau_k$=the misalignment between the received signal and the chip time $T_c$. The received signal can be mixed with the identical spreading code used to produce each vibrator's output signal, $u_i(t_0)$, as shown in FIG. 1B. Such mixing will provide a signal that can be correlated to the signal used to drive each particular vibrator. The mixing output can be used to determine the seismic response of the signals originating from each respective vibrator. The foregoing may be expressed as follows for the detected signals:

$$y_i(\tau_i + l_i T_c + t_0) = u_i(t_0) x_i(\tau_i + l_i T_c + t_0) \quad \text{(Eq. 22)}$$
$$= u_i(0) x_i(\tau_i + l_i T_c)$$
$$= u_i(0) \left( \sum_{k=1}^{K} u_k(\tau_k + l_k T_c) + n(t) \right)$$
$$= u_i(\tau + l_i T_c) u_i(0) +$$
$$\sum_{k=1, k \neq i}^{M} u_k(\tau_k + l_k T_c) u_i(0) + u_i(t) n(t)$$

Mixing (FIG. 1B) the detected signal with the spreading code results in a correlation. The result of the correlation is:

$$R_{yu_i}(\tau_i + l_i T_c) = \quad \text{(Eq. 23)}$$
$$\sum_{j=0}^{N-1} \psi(0) \psi(\tau_i) c_i^j c_i^{j+l} + \sum_{j=0}^{N-1} \left[ \psi(0) \sum_{k=1, k \neq i}^{M} \psi(\tau_k) c_i^j c_k^{j+l_k} \right] + u_i(t) n(t)$$

Simplification of the above expressions provides the following result:

$$R_{yu_i}(\tau_i + l_i T_c) = d_i \psi(0) \psi(\tau_i) \sum_{j=0}^{N-l_i-1} c_i^j c_i^{j+l} + \quad \text{(Eq. 24)}$$
$$\psi(0) \sum_{k=1, k \neq i}^{M} \left[ \sum_{j=0}^{N-l_k-1} \psi(\tau_k) c_i^j c_k^{j+l_k} \right] + u_i(t) n(t)$$
$$= \psi(0) \psi(\tau_i) R_{u_i u_i}(l_i) +$$
$$\psi(0) \sum_{k=1, k \neq i}^{M} \left[ \psi(\tau_k) R_{u_i u_j}(l_k) \right] + u_i(t) n(t)$$

If $R(0) = N$ and $\psi(0) = 1$, the foregoing expression simplifies to:

$$R_{yu_i}(0) = \psi(0)^2 R_{u_i u_i}(0) + \psi(0) \sum_{k=1, k \neq i}^{M} \left[ \psi(\tau_k) R_{u_i u_j}(l_k) \right] + \quad \text{(Eq. 25)}$$
$$u_i(t) n(t)$$
$$= \underbrace{N}_{data} + \underbrace{\sum_{k=1, k \neq i}^{M} \left[ \psi(\tau_k) R_{u_i u_j}(l_k) \right]}_{cross\_correlations} + \underbrace{u_i(t) n(t)}_{background\_noise}$$

Equation (25) shows that it is possible to separate the direct spread spectrum sequence signals corresponding to each spreading code from a signal having components from a plurality of spreading codes. N in essence represents the autocorrelation of the transmitted signal, and by using substantially orthogonal or uncorrelated spread spectrum signals to drive each marine vibrator, the cross correlation between them will be very small compared to N. Another possible advantage is that any noise which appears during a part of the time interval when the seismic signals are recorded will be averaged out for the whole record length and thereby attenuated, as may be inferred from Eq. 25.

In a practical implementation, a seismic response of the subsurface to imparted seismic energy from each of the vibrators may be determined by cross correlation of the detected seismic signals with the signal used to drive each vibrator, wherein the cross correlation includes a range of selected time delays, typically from zero to an expected maximum two way seismic energy travel time for formations of interest in the subsurface (usually about 5 to 6 seconds). Output of the cross correlation may be stored and/or presented in a seismic trace format, with cross correlation amplitude as a function of time delay.

The baseband carrier has two properties that may be optimized. The baseband carrier should be selected to provide the vibrator output with suitable frequency content and an autocorrelation that has a well defined correlation peak. Equation (25) also shows that the length of the direct spread spectrum sequence will affect the signal to noise ratio of the vibrator signal. The correlation peaks resulting from the cross correlation performed as explained above will increase linearly with the length of (the number of chips) the spreading code. Larger N (longer sequences) will improve the signal to noise properties of the vibrator signal.

Using appropriately selected spreading code sequences it is possible to generate seismic signals that approximate background noise in spectral statistics. Some useful sequences that can be used for a plurality of seismic vibrators are discussed below.

"Maximum length" sequences are a type of cyclic code that are generated using a linear shift register which has m stages connected in series, with the output of certain stages added modulo-2 and fed back to the input of the shift register. The name "maximum length" sequence derives from the fact that such sequence is the longest sequence that can be generated using a shift register. Mathematically the sequence can be expressed by the polynomial h(x)

$$h(x) = h_0 x_m + h_1 x_{m-1} + \ldots + h_{n-1} x + h_n \quad \text{(Eq. 26)}$$

For $1 \leq j < m$, then $h_j = 1$ if there is feedback at the j-th stage, and $h_j = 0$ if there is no feedback at j-th stage. $h_0 = h_m = 1$. Which stage $h_j$ that should be set to one or zero is not random but should be selected so that h(x) becomes a primitive polynomial. "Primitive" means that the polynomial h(x) cannot be factored. The number of chips for a maximum length sequence is given by the expression $N = 2m-1$, where m represents the number of stages in the shift register. The maximum length sequence has one more "1" than "0." For a 511 chip sequence, for example, there are 256 ones and 255 zeros.

Another type of sequence that may be used is the Gold sequence. The structure of Gold sequences is described in, R. Gold, *Optimal binary sequences for spread spectrum multiplexing*, IEEE Trans. Information Theory, vol. IT-13, pp. 619-621 (1967). Gold sequences have good cross correlation characteristics suitable for use when more than one vibrator is used at the same time. Gold sequences are generated using two or more maximum length sequences. It is possible to generate N+2 Gold-sequences from maximum length sequences, where N is the sequence length. Gold-sequences have the period $N = 2^m - 1$ and exist for all integers m that are not a multiple of 4. A possible drawback of Gold sequences is that the autocorrelation is not as good as for maximum length sequences.

Kasami sequence sets may be used in some examples because they have very low cross-correlation. There are two different sets of Kasami sequences. A procedure similar to that used for generating Gold sequences will generate the "small set" of Kasami sequences with $M=2^{n/2}$ binary sequences of period $N=2^n-1$, where n is an even integer. Such procedure begin with a maximum length sequence, designated a, and forming the sequence a' by decimating a by $2^{n/2}+1$. It can be shown that the resulting sequence a' is a maximum sequence with period $2^{n/2}-1$. For example, if n=10, the period of a is N=1023 and the period of a' is 31. Therefore, by observing 1023 bits of the sequence a', one will observe 33 repetitions of the 31-bit sequence. Then, by taking $N=2^n-1$ bits of sequences a and a' it is possible to form a new set of sequences by adding, modulo-2, the bits from a and the bits from a' and all $2^{n/2}-2$ cyclic shifts of the bits from a'. By including a in the set, a result is a set of $2^{n/2}$ binary sequences of length $N=2^n-1$. The autocorrelation and cross-correlation functions of these sequences take on the values from the set $\{-1, -(2^{n/2}+1), 2^{n/2}-1\}$. The "large set" of Kasami sequences again consists of sequences of period $2^n-1$, for n being an even integer, and contains both the Gold sequences and the small set of Kasami sequences as subsets. See, for example, *Spreading Codes for Direct Sequence CDMA and Wideband CDMA Cellular Networks*, IEEE Communications Magazine, September 1998.

Figure 8:
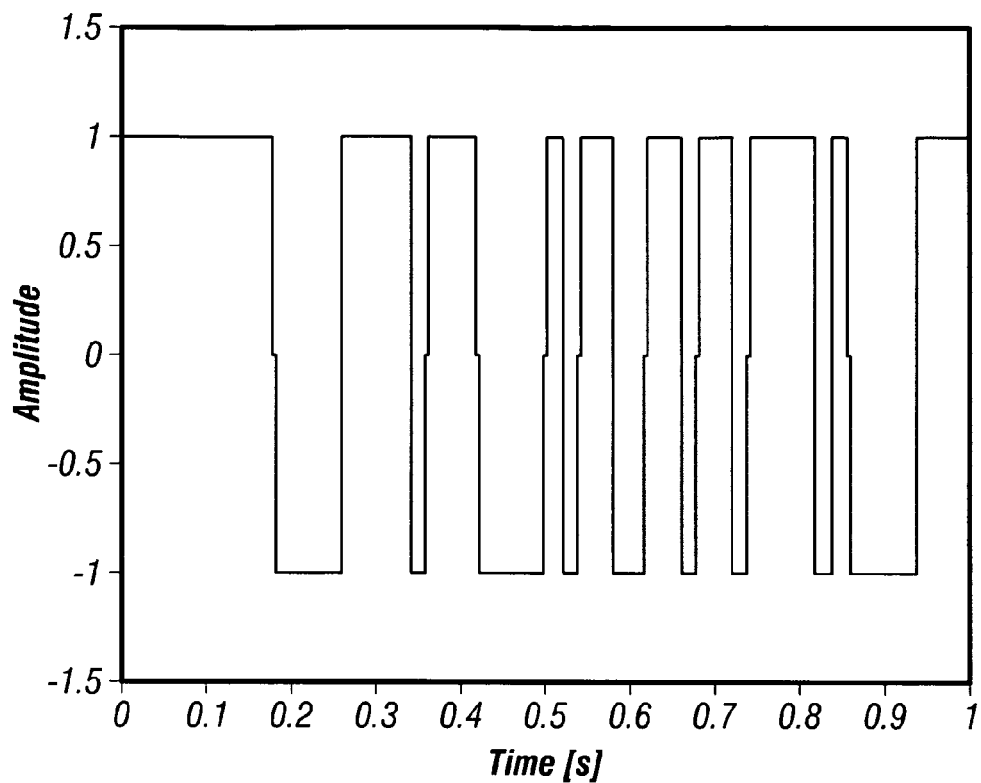
FIG. 8 is an example of a direct sequence spread spectrum (DSSS) code.
Figure 9:
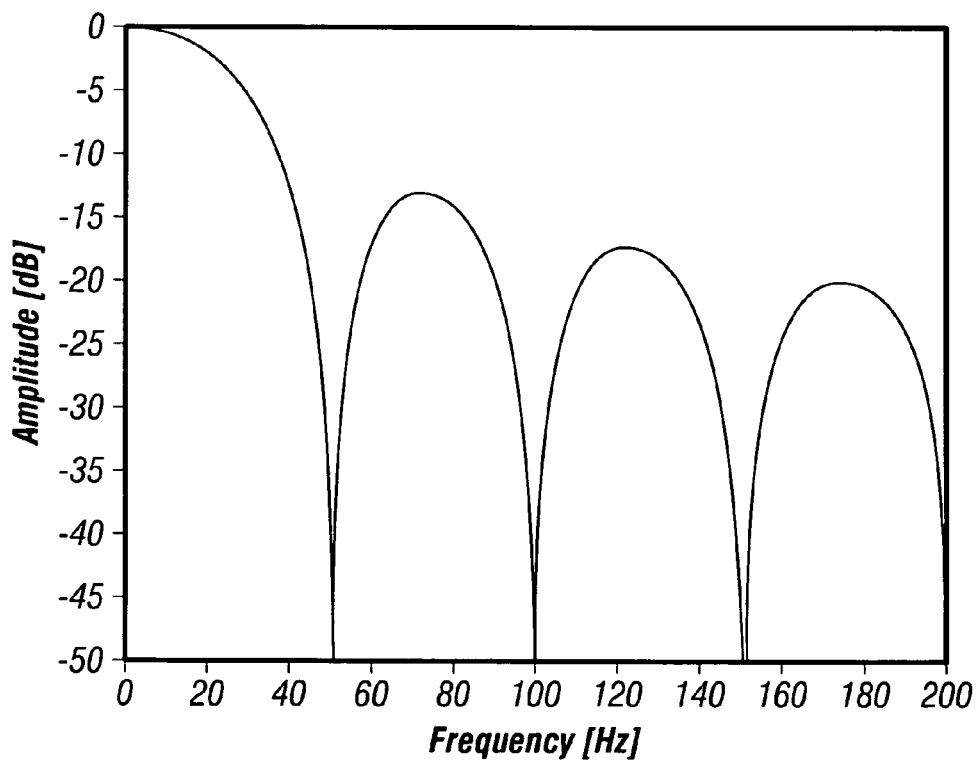
FIG. 9 is a graph of frequency content of a seismic source driven using a signal coded according to FIG. 8.
Figure 10:
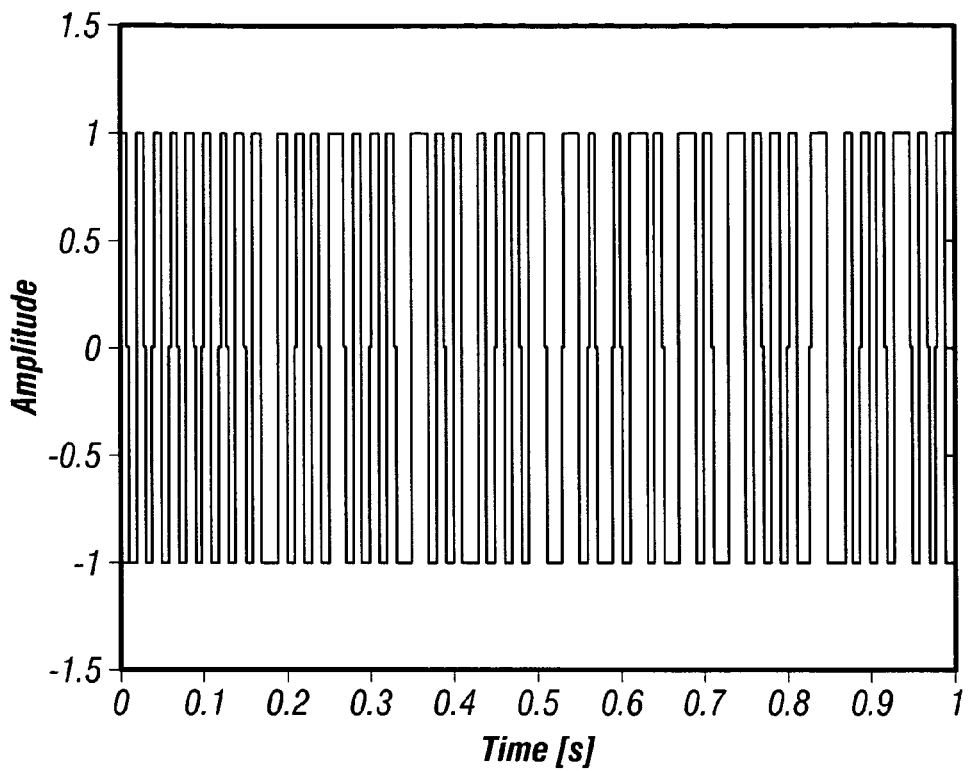
FIG. 10 is an example spread spectrum code using biphase modulation.
Figure 11:
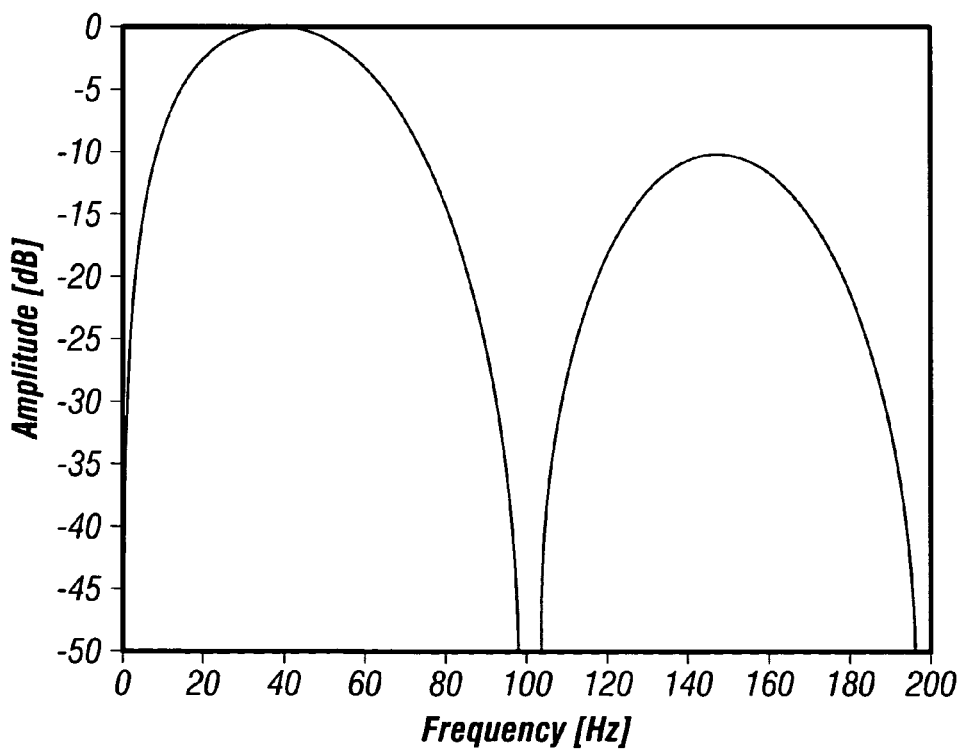
FIG. 11 is a graph of the frequency content of a seismic source driven using a signal coded according to FIG. 10.

In implementing spreading codes to generate a driver signal for the vibrators, it may be preferable to use biphase modulation to generate the chips in the code. Referring to FIG. 8, an example spreading code is shown wherein the code is represented by a series of numbers +1 and −1. The signal spectrum generated by the above spreading code is shown in FIG. 9. What is apparent from FIG. 9 is that a substantial signal amplitude exists at DC (zero frequency). Such signal spectrum is generally not suitable for seismic signal generation. If the modulation used is biphase, however, the signal amplitude at zero frequency is substantially zero. The same spreading code shown in FIG. 8 implemented using biphase modulation is shown in FIG. 10. Biphase modulation can be implemented by having every bit of the original input signal (chips in the spreading code, each of which is either the value +1 or −1) represented as two logical states which, together, form the chip. Every logical "+1" in the input can be represented, for example, as a polarity change from −1 to +1. Every input logical "−1" in the present example can be represented as a change in polarity from +1 to −1 . . . . The signal spectrum of the spreading code shown in FIG. 10 is shown in FIG. 11. The signal amplitude at zero frequency is zero, thus making such code more suitable for seismic energy generation. As will be further explained below with reference to FIGS. 17 through 20, the output of the modulator (42 in FIG. 1B) may be further modified such that a selected number of the foregoing biphase modulation operations (that is, change in polarity from −1 to +1 and vice versa) may be performed to represent each logical +1 or −1 (chip) of the DSSS code input signal. In one example, the same DSSS code may be used as a driver signal to operate a plurality of vibrators. The number of modulation operations per chip applied to the same DSSS code is uniquely selected and used to modulate the driver signal for each of the plurality of vibrators.

Figure 15:
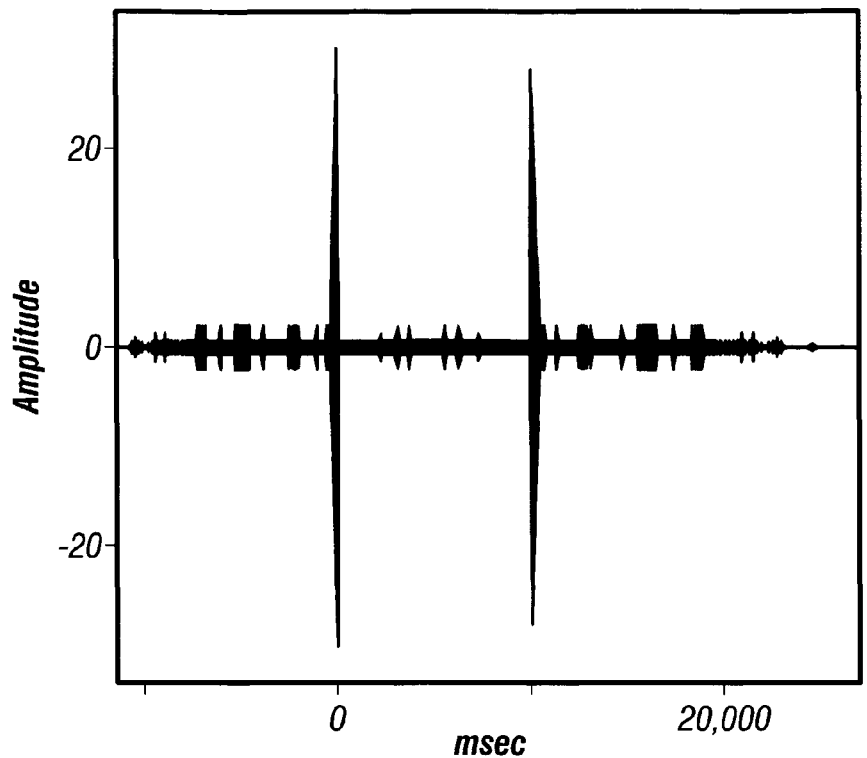
FIG. 15 shows an autocorrelation of the sum of the signals in FIGS. 13A and 14A.

An example of a low frequency DSSS code used to drive a suitably configured vibrator is shown in FIG. 12A. The DSSS code may be configured to provide a selected frequency output by suitable selection of the chip rate. A spectrum of energy output of a suitably configured vibrator using the code of FIG. 12A is shown in corresponding FIG. 12B. FIG. 13A shows a DSSS code used to drive a higher frequency configured vibrator. Responses of the vibrator (signal output spectrum) of such vibrator to the DSS code of FIG. 13A is shown in FIG. 13B. Both seismic signals are effectively summed. After detection of the signals from each such vibrator in the received seismic signals as explained above, the detected signals may be summed. The combined DSSS signals are shown in FIG. 14A, and the combined vibrator output spectrum is shown in FIG. 14B. An autocorrelation of the summed signals is shown in FIG. 15 indicating two distinct correlation peaks, one for each DSSS code. The various vibrators may each be operated at a selected depth in the water corresponding to the frequency range of each vibrator.

As explained at the beginning of the present description, in some examples, more than one vibrator may be used at any particular location in the water, for example, as shown in FIG. 1 at 10 being towed by the seismic survey vessel, and as shown at 10 being towed by one or more source vessels. In such multiple vibrator configurations, each of the vibrators shown at 10 in FIG. 1 may be substituted by two or more marine seismic vibrators (a vibrator "array") made as described herein with reference to FIGS. 3 through 6. In the present example, each such vibrator array at each individual location has two or more vibrators each having a different frequency response. Frequency response of the particular vibrator may be determined, for example as explained above with reference to FIGS. 3, 4 and 5, by suitable selection of the mass of the outer shell, additional masses, and the rates of the inner and outer springs.

Generally, marine seismic surveying uses a source frequency range of about 1-100 Hz. In some examples, a vibrator array may include a low frequency range vibrator to generate a low frequency part of the seismic signal e.g., (3-25 Hz) and another, higher frequency range vibrator to generate higher frequency seismic energy (e.g., 25-100 Hz). As explained above, the disclosed type of marine vibrator may have two or more resonance frequencies within the seismic frequency band. To be able to obtain high efficiency from each of the vibrators in the array the vibrators the vibrators may each be configured to have a high efficiency response within only a selected portion of the seismic frequency range of interest. Using a plurality of vibrators each having a relatively narrow but different frequency response range will ensure more efficient operation of each vibrator in the array of vibrators. In a specific example, it is possible to tow each of the vibrators in the array at different selected depths to improve the acoustic output of the array.

Further, as explained above, it is also possible to drive each of the vibrators in an array with a driver signal having a corresponding frequency range. By driving each vibrator with a driver signal having a frequency range corresponding to the frequency range of the vibrator, it is possible to optimize output of each vibrator in the array.

As an example, an array of vibrators includes three vibrators made as explained with reference to FIGS. 3 through 5 each operating in the following frequency ranges:

Vibrator 1: 5-15 Hz
Vibrator 2: 15-45 Hz
Vibrator 3: 45-120 Hz

In one example, each vibrator is towed at a depth such that the amplitude of the seismic energy propagating in a downward direction (toward the water bottom) from each vibrator is amplified by the effect of reflection of seismic energy from the water surface (i.e., the source ghost). By towing the vibrators at such depths it may be possible to achieve up to 6 dB improvement in the output of the array due to the surface ghost. An example response of a three vibrator array with appropriately selected vibrator depths is shown graphically in FIG. 16. The curves in FIG. 16 represent the output of the above three vibrators towed at 30 meters, 15 meters and 7 meters, respectively shown at 50, 52 and 54 in FIG. 16. What may be observed in FIG. 16 is that by using marine vibrators having appropriately selected frequency response, and by appropriate selection of the operating depth of each such vibrator, it is possible to use the surface ghost to amplify the energy propagating in a downward direction from each vibrator in the array.

In order to cause the output of the vibrators in each array to act as a single source of seismic energy (and thus to sum the output of the vibrators shown in FIG. 16) it is also necessary to take into account the delay that will be caused by operating the vibrators at different depths. Summing the sources together requires using expressions similar to the following (if the acoustic velocity in water is assumed to be 1500 meters/sec.) to compensate for the different depth of each vibrator:

Vibrator1(t)+Vibrator2(t+$dt_{source2}$)+ Vibrator3(t+$dt_{source3}$)

$dt_{vibrator2}$=(vibrator_depth1−vibrator_depth2)/1500

$dt_{vibrator3}$=(vibrator_depth1−vibrator_depth3)/1500

By providing an array of vibrators and by selecting vibrators in the array with specific frequency response and by operating each vibrator at a depth corresponding to its frequency response, the result is an optimization of both the vibrator frequency response and the depths at which to tow each vibrator to gain the most power in penetrating the subsurface.

Figure 17:
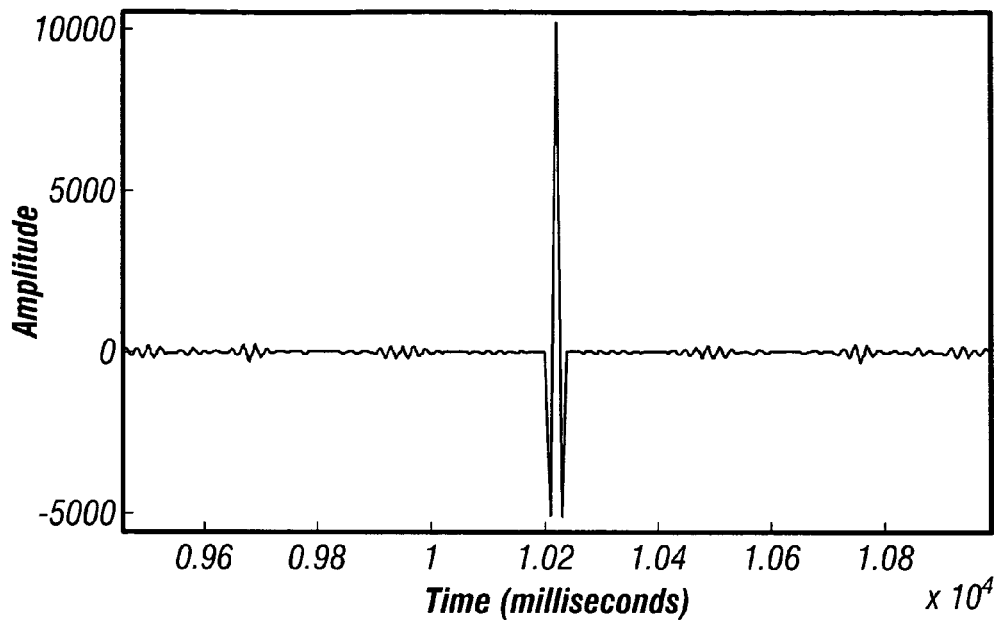
FIG. 17 shows an autocorrelation function of an example of a 255 chip DSSS driver signal using one biphase modulation operation per chip.

Referring to FIG. 17, an example of using different numbers of biphase modulation operations on each chip of DSSS driver signal will be explained. FIG. 17 shows the autocorrelation function of a maximum length (explained above) 255 chip DSSS code wherein each chip is modulated by one biphase modulation operation. When such a signal is used to drive a seismic vibrator having a frequency range of, for example, 6-35 Hz, the resulting output spectrum of such vibrator is shown in FIG. 18.

Figure 19:
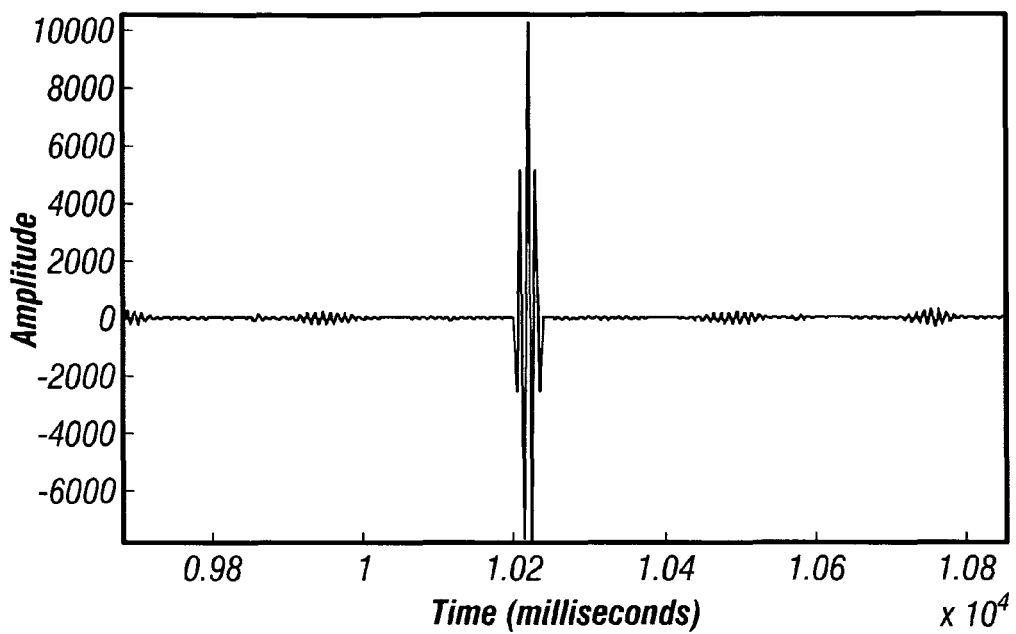
FIG. 19 shows an autocorrelation function of the same example of the same 255 chip DSSS driver signal of FIG. 17, wherein two biphase modulation operations per chip are used.
Figure 20:
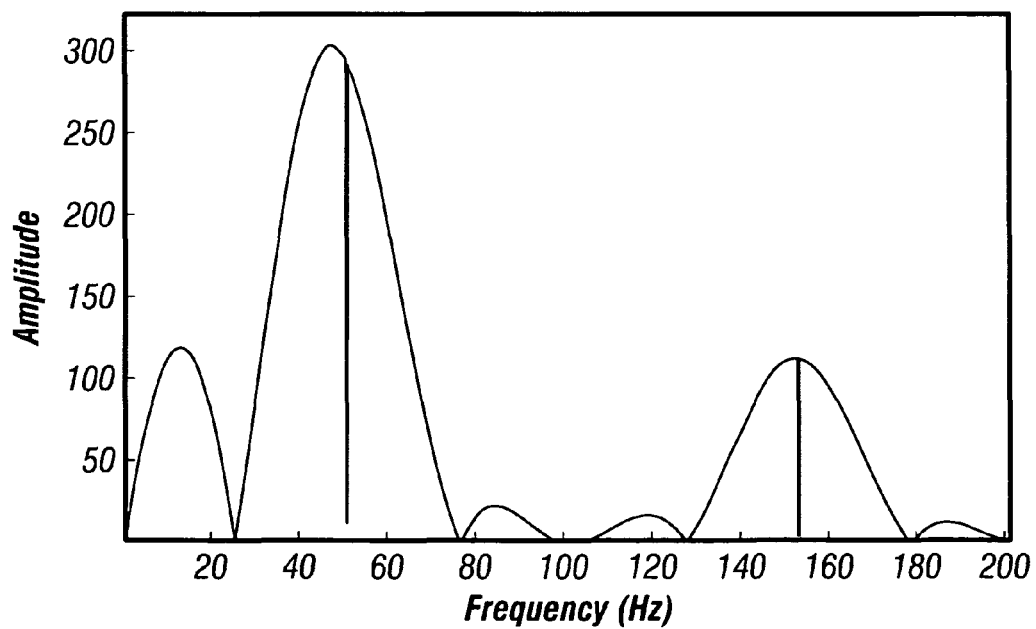
FIG. 20 shows frequency content of a vibrator operated using the driver signal described with reference to FIG. 19.
Figure 21:
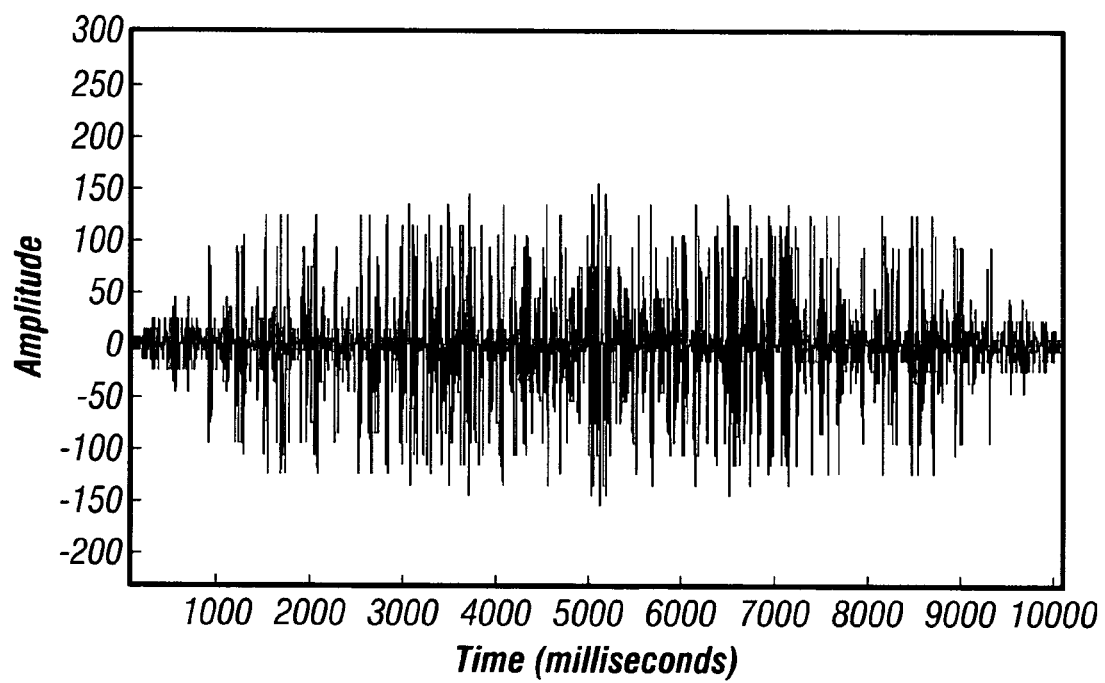
FIG. 21 shows a cross correlation between the driver signal described with reference to FIG. 17 and the driver signal described with reference to FIG. 19.

FIG. 19 shows the autocorrelation function of the same 255 chip maximum length DSSS code, but this time modulated by two biphase modulation operations per chip. The chip length is constant. If such signal is used to operate a vibrator having a frequency range, for example, of 35-70 Hz, a resulting vibrator output spectrum is shown in FIG. 20. FIG. 21 shows that the cross correlation between the DSSS signal modulated using one biphase operation per chip and the same DSSS signal using modulated two biphase operations per chip may be sufficiently low to enable uniquely determining the particular vibrator that is the source of seismic energy in the signals detected by the seismic receivers (R in FIG. 1).

In a practical implementation of the foregoing, a number of biphase modulation operations per chip may be selected to correspond to the frequency range of the respective vibrator.

Seismic vibrators and methods for operating such vibrators according to the various aspects of the invention may provide more robust seismic signal detection, may reduce environmental impact of seismic surveying by spreading seismic energy over a relatively wide frequency range, and may increase the efficiency of seismic surveying by enabling simultaneous operation of a plurality of seismic sources while enabling detection of seismic energy from individual ones of the seismic sources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating seismic energy for subsurface surveying, comprising:

operating a first seismic vibrator above an area of the subsurface to be surveyed; and operating at least a second seismic vibrator above the area substantially contemporaneously with the operating the first seismic vibrator, the first seismic vibrator and the at least a second vibrator each having a different selected frequency response range, the first and second vibrators each operated by a same direct sequence spread spectrum driver signal, wherein a different number of modulation operations for each logical value in the direct sequence spread spectrum signal is selected for each vibrator.

2. The method of claim 1 wherein each number of modulation operations is selected to correspond to the frequency response range of each vibrator.

3. The method of claim 1 wherein the direct sequence spread spectrum signal comprises at least one of a maximum length sequence code, a Gold sequence code and a Kasami sequence code.

4. The method of claim 1 wherein each vibrator has at least two resonance frequencies in a selected frequency band.

5. The method of claim 1 wherein the area of the subsurface comprises a body of water, and wherein an actuation time of each vibrator corresponds to a depth at which each vibrator is operated in the body of water such that the first and at least a second vibrators act as a vibrator array.

6. The method of claim 5 wherein the vibrators each operated at a water depth such that a surface ghost amplifies a downward output of each vibrator within a selected frequency range.

7. The method of claim 1 wherein the modulation operation comprises biphase modulation.

8. A method for subsurface seismic surveying, comprising:

operating a plurality of seismic vibrators each having a different selected frequency response range above an area of the subsurface to be surveyed; and detecting seismic signals originating from the plurality of vibrators at each of a plurality of seismic receivers disposed at spaced apart locations above the area;

wherein each vibrator is operated by a same direct sequence spread spectrum driver signal;

wherein a different number of modulation operations for each logical value in the driver signal is selected for each vibrator; and determining seismic energy originating from each of the plurality of vibrators in the detected seismic signals.

9. The method of claim 8 wherein each number of modulation operations is selected to correspond to the frequency response range of each vibrator.

10. The method of claim 8 wherein the direct sequence spread spectrum signal comprises at least one of a maximum length sequence code, a Gold sequence code and a Kasami sequence code.

11. The method of claim 8 wherein each vibrator has at least two resonance frequencies in a selected frequency band.

12. The method of claim 8 wherein the area of the subsurface comprises a body of water, and wherein an actuation time of each vibrator corresponds to a depth at which each vibrator is operated in the body of water such that the first and at least a second vibrators act as a vibrator array.

13. The method of claim 12 wherein the vibrators each operated at a water depth such that a surface ghost amplifies a downward output of each vibrator within a selected frequency range.

\* \* \* \* \*